(12) United States Patent
Casado Domínguez et al.

(10) Patent No.: US 10,400,093 B2
(45) Date of Patent: Sep. 3, 2019

(54) CURABLE FORMALDEHYDE-FREE RESIN DISPERSION WITH REDUCED VISCOSITY AND MINERAL WOOL PRODUCTS PRODUCED THEREWITH

(71) Applicant: URSA Insulation, S.A., Madrid (ES)

(72) Inventors: Arturo Luis Casado Domínguez, Paracuellos de Jarama (ES); María Mercedes Castro Cabado, Madrid (ES)

(73) Assignee: URSA Insulation, S.A., Madrid (ES)

( * ) Notice: Subject to any disclaimer, the term of this patent is extended or adjusted under 35 U.S.C. 154(b) by 0 days.

(21) Appl. No.: 15/129,623

(22) PCT Filed: Mar. 26, 2015

(86) PCT No.: PCT/EP2015/056626
§ 371 (c)(1),
(2) Date: Sep. 27, 2016

(87) PCT Pub. No.: WO2015/144843
PCT Pub. Date: Oct. 1, 2015

(65) Prior Publication Data
US 2017/0137614 A1    May 18, 2017

(30) Foreign Application Priority Data
Mar. 28, 2014    (EP) .................................... 14162331

(51) Int. Cl.
*C08L 3/02* (2006.01)
*C08L 33/02* (2006.01)
*C09J 103/02* (2006.01)
*C09J 133/02* (2006.01)

(52) U.S. Cl.
CPC ............... *C08L 3/02* (2013.01); *C08L 33/02* (2013.01); *C09J 103/02* (2013.01); *C09J 133/02* (2013.01); *C08L 2201/54* (2013.01)

(58) Field of Classification Search
CPC .............................. C09J 33/02; C09J 103/02
See application file for complete search history.

(56) References Cited

U.S. PATENT DOCUMENTS

| | | | | |
|---|---|---|---|---|
| 3,981,833 | A * | 9/1976 | Lark | D06M 15/11 442/187 |
| 5,661,213 | A * | 8/1997 | Arkens | C08F 8/14 524/555 |
| 6,071,994 | A * | 6/2000 | Hummerich | C08K 5/17 524/247 |
| 2003/0143277 | A1* | 7/2003 | Ameye | A61K 9/0043 424/487 |
| 2004/0122166 | A1* | 6/2004 | O'Brien-Bernini | C09J 133/04 525/54.31 |
| 2004/0254285 | A1* | 12/2004 | Rodrigues | C03C 25/28 524/494 |
| 2007/0082573 | A1* | 4/2007 | Noda | A61L 15/28 442/361 |
| 2008/0108741 | A1* | 5/2008 | Van Herwijnen | C03C 25/26 524/443 |
| 2009/0275699 | A1 | 11/2009 | Zhang et al. | |
| 2010/0282996 | A1* | 11/2010 | Jaffrennou | C03C 25/146 252/8.83 |
| 2012/0070645 | A1 | 3/2012 | Jaffrennou et al. | |
| 2012/0319029 | A1* | 12/2012 | Jaffrennou | C03C 25/32 252/62 |
| 2013/0032749 | A1 | 2/2013 | Jaffrennou et al. | |
| 2013/0295361 | A1* | 11/2013 | Varagnat | C03C 25/321 428/219 |
| 2015/0203667 | A1* | 7/2015 | Netravali | C08B 31/003 106/162.9 |
| 2015/0321958 | A1* | 11/2015 | Castro-Cabado | C09J 103/02 252/62 |
| 2016/0053418 | A1* | 2/2016 | Eckert | D04H 1/587 428/219 |

FOREIGN PATENT DOCUMENTS

| WO | 2008/053332 | 5/2008 |
|---|---|---|
| WO | 2009/080938 | 7/2009 |
| WO | 2014/001518 | 1/2014 |

* cited by examiner

*Primary Examiner* — Liam J Heincer
(74) *Attorney, Agent, or Firm* — Dicke, Billig & Czaja, PLLC

(57) ABSTRACT

A curable formaldehyde-free resin in the form of an aqueous dispersion. The resin comprising components a), b) and c), wherein: a) is water-insoluble native starch, b) is a polycarboxylic polymer, and c) is non-polymeric polycarboxylic acid compound, and wherein the amount of polycarboxylic polymer (b) comprised in the resin is between 2 and 45 wt.-% relative to the sum of the weights of the components a), b) and c).

20 Claims, 4 Drawing Sheets

CURABLE FORMALDEHYDE-FREE RESIN DISPERSION WITH REDUCED VISCOSITY AND MINERAL WOOL PRODUCTS PRODUCED THEREWITH

CROSS REFERENCE TO RELATED APPLICATION

This Utility Patent Application claims priority under 35 U.S.C. § 371 to International Application Serial No. PCT/EP2015/056626, filed Mar. 26, 2015, which claims the benefit of European Patent Application No. EP 14162331.4, filed Mar. 28, 2014; which are both incorporated herein by reference.

FIELD THE INVENTION

The present invention relates to improved curable formaldehyde-free resin dispersions for the manufacture of mineral fiber products such as mineral wool insulating products. The curable resin has reduced viscosity and comprises an aqueous dispersion of a) a water-insoluble native starch, b) polycarboxylic polymer, and c) non-polymeric polycarboxylic acid compound, wherein the amount of polycarboxylic polymer comprised in the resin is between 2 and 45 wt.-% relative to the sum of the weights of the components a), b) and c).

BACKGROUND

Mineral wool products are widely used for the thermal and acoustic insulation of different parts of buildings, transportations, or other appliances, as well as for fire protection. Mineral wool materials are mainly randomly interlaced masses of mineral fibers with varying lengths and usually bound by a resin-based binder. Three types of mineral materials are most commonly employed, glass, stone or slag. Mineral wool is formed by an intricate network of fibers which might be bonded in their cross-over points by different means, e.g. by using a cured binder. Processes for the production of mineral wool products are well known in the art, and usually comprise the steps of melting the mineral material to an adequate temperature, fiberizing the molten mixture into fine fibers, application (e.g. spraying) of a binder composition to the individual fibers, collection of the fibers and formation of a primary fleece on a foraminous conveyor, densifying the fleece, and curing the binder at elevated temperatures. The cured mat is then cut to the desired size with transverse and edge trimmers and optionally rolled up, before it is packaged for transport.

The type and amount of binder used to bond the fibers in the mineral wool plays an important role in the final properties of the produced mineral wool. A variety of binder systems have been described in the art, including binders based on melamine urea formaldehyde resins, furane-based resins, and others, but phenol-formaldehyde resin based binders have been preferred for very long time, due to their good performance and attractive low cost.

Environmental and toxicological concerns related to the formaldehyde released from the products manufactured with phenol-formaldehyde resin based binders have however led to a movement in the mineral wool industry to reduce or completely eliminate the use of such resins, or to reduce the amount of excess formaldehyde they contain.

In this regard, different formaldehyde-free resins have been described in the art, which are claimed to reduce formaldehyde emissions to zero. Some illustrative examples of these alternative resins are a) resins based on the esterification reaction between carboxylated polymers (e.g. acrylic copolymers) and low molecular weight polyfunctional alcohols, as those resins described in EP0583086B1 and U.S. Pat. No. 6,071,994A; b) resins using renewable carbohydrate materials reacted with a low molecular weight polyacid as a crosslinker, e.g. those described in US20100282996A1; and c) resins based on the Maillard reaction between a reducing sugar, and acid precursor and a source of nitrogen, as for example those described in WO200919232A.

Starch and its derivatives, due to their large availability at low cost, have also been explored as the renewable component for formaldehyde-free resin based binder compositions. Curable starch-based resins have exploited the fact that starch has a large number or hydroxyl-groups distributed along its polysaccharide chains which could potentially take part in curing reactions. For instance, these hydroxyl-groups have been targeted for crosslinking reactions of starch with carboxylic groups of organic polyacids. The suitable organic polyacids can be polymeric polycarboxylic acids (especially polyacrylic acid and its derivatives) and/or low molecular weight polycarboxylic acids (e.g. citric acid) as described in EP0911361B1 and US20090275699A1 and WO2008053332A1.

Native starch is a specific type of starch particularly interesting from the industrial perspective, due to its wide availability, reduced price, easy handling and long storage stability. Native starch does not require to be modified chemically, or by other means, in forehand to its use. A specific property that makes the use of native starch attractive for curable formaldehyde-free resins, which are to be used as base for binders for mineral wool products, is its higher resistance to degradation in humid conditions compared to the modified starches, starch derivatives (e.g. dextrins) and other saccharides, what at the end translates in a better resistance to weathering influences and in a better ageing behavior of the bonded mineral wool products. This is due in part to the ultra-high molecular weight of native starch and its granular structure. However, native starch presents several drawbacks which have made difficult its use in this type of applications, like the low solubility in cold water or the instability of its dispersions, as well as the high viscosity of the solutions obtained after solubilization (e.g. after gelatinization, hydrolysis, etc.).

It has recently been described by the applicant (application number PCT/EP2013/063660) that a curable binder composition comprising water insoluble native starch and a polycarboxylic polymer component can be prepared in form of dispersions in water. The so prepared binder compositions can be sprayed over the mineral fibers and cured for the manufacture of mineral wool products. However, this binder system has some limitations.

A particular downside of these resins and binders is related to the viscosity of the dispersions obtained. In general, when using resins in binders for mineral wool, it is desired that their viscosity is as low as possible. The low viscosity, in addition to facilitate handling of the resin, e.g. by pumping, mixing, etc., it also has an effect in the properties of the mineral wool products obtained after curing. Thus, for instance, low viscosity enables better penetration of the sprayed binder into the forming felt of mineral fibers, and it assures the required homogeneity of the binder distribution onto the individual fibers and through the thickness of the mineral wool mat.

Even more importantly, a lower viscosity of the resin improves the distribution of the binder preferentially into the cross-over points between the fibers forming the mineral wool mat, what translates in better recovery of the thickness of the uncured primary fleece on the foraminous conveyor, and in better mechanical properties of the mineral wool product obtained after curing. When the individual fibers are coated with binder, e.g. by the spraying technique, these fibers are just being formed from a mineral melt by a fiberizer, and they are still warm. The remaining heat of the fibers produces a rapid evaporation of the water contained in the binder mixture, increasing its solid content, and thereby drastically increasing the viscosity of the binder composition on the fibers. Thus, in this situation, the higher the viscosity contribution of the resin, the lower the mobility of the binder towards the cross-over points between the fibers of the mat.

Because of the reasons explained above, the phenol-formaldehyde resins broadly and successfully used in binders for the manufacture of mineral wool products favorably have a viscosity well below 50 mPa·s, usually below 20 mPa·s, when measured at a solid content of 45-55 wt.-%.

Regarding the resins in form of a dispersion described in the patent application number PCT/EP2013/063660, the viscosity of the dispersion is increased when the proportion of polycarboxylic polymer, e.g. acrylic resin, is increased, due to the fact that these polymers usually are water soluble high molecular weight compounds. On the other hand, when the relative content of polycarboxylic polymer is reduced, particularly below 45 wt.-%, e.g. to obtain a low viscosity, the mechanical bonding properties of the cured binder are detrimentally affected. As a consequence, in this resin system, a compromise has to be reached between the compositions giving lower viscosity and the compositions producing enhanced mechanical bonding properties.

From the above it is evident that there is still a need for improved curable formaldehyde-free binder compositions for the manufacture of mineral wool products, particularly binders which are based on resins in form of dispersions comprising water insoluble native starch, which overcomes the limitations and downsides of this type of resins previously known in the art, and which optionally have a higher environmental sustainability and/or are more economical.

The inventors surprisingly found that very useful resins and binders in form of dispersions comprising water insoluble native starch can be obtained by the present invention, which show reduced viscosity, and in which the mechanical bonding properties obtained after curing are not detrimentally affected and even are significantly improved.

DETAILED DESCRIPTION OF THE EMBODIMENTS OF THE INVENTION

Figure 1:
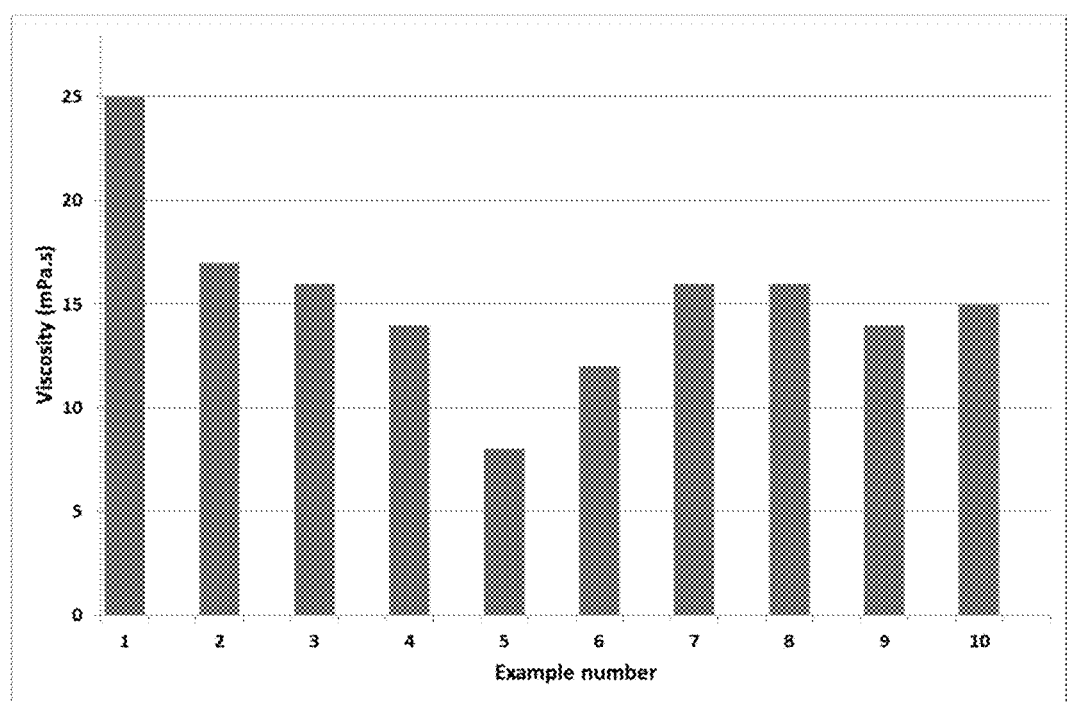
FIG. 1 is a graphical representation of the values of viscosity obtained from the resins of examples 1-10. Examples 2-10 are inventive examples, while example 1 is a non-inventive comparative example.

In view of the above, the invention is directed to overcome the problems and limitations of previously known approaches and to develop an improved formaldehyde-free curable resin according to the claims. The inventive resin shows reduced viscosity, improved mechanical bonding strength, and is very suitable for the preparation of a binder for the manufacture of mineral wool. The invention also concerns a method for the preparation of an improved curable resin and the improved mineral wool manufactured by using the resin of the invention.

In a first embodiment of the present invention, it is provided a curable resin in the form of an aqueous dispersion, comprising components a), b) and c), wherein a) is water-insoluble native starch, b) is polycarboxylic polymer, and c) is non-polymeric polycarboxylic acid compound, and wherein the amount of polycarboxylic polymer (b) comprised in the resin is between 2 and 45 wt.-% relative to the sum of the weights of the components a), b) and c).

Preferred inventive resins comprise as the polycarboxylic polymer at least one homopolymer, at least one copolymer or mixtures thereof. The homopolymer and/or copolymer comprise at least two carboxylic acid groups, anhydride groups, or salts thereof, or mixtures thereof, per polymer molecule. The polycarboxylic polymer has a weight average molecular weight of at least 400 g/mol, typically in the range of from 500 to 10,000 g/mol, preferably from 600 g/mol to 2,000 g/mol. More preferably, the polycarboxylic polymer comprises at least one polymer formed by addition polymerization of ethylene-unsaturated monomers, containing from 10 to 100 mol-% polymerized repeating units of acrylic acid, maleic acid, maleic anhydride or salts thereof, or mixtures thereof.

In embodiments of the invention, the resin additionally comprises a polyol of molecular weight less than 1000 g/mol, more preferably less than 500 g/mol.

The inventive resin might additionally comprise an esterification catalyst.

Conveniently, the polycarboxylic polymer of the invention can be formed by a polycarboxylic polymer resin pre-mixture comprising polycarboxylic polymer, polyol of molecular weight less than 1000 g/mol, preferably less than 500 g/mol and esterification catalyst.

In embodiments, the amount of polycarboxylic polymer ranges from 2-45 wt.-%, preferably from 5-30 wt.-% and more preferably from 10-25 wt.-%, related to the sum of the weights of native starch, polycarboxylic polymer and non-polymeric polycarboxylic acid compound components.

In embodiments, the amount of non-polymeric polycarboxylic acid compound ranges from 5-50 wt.-%, preferably from 10-40 wt.-% and more preferably from 15-30 wt.-%, related to the sum of the weights of native starch, polycarboxylic polymer and non-polymeric polycarboxylic acid compound components.

The amount of native starch, in embodiments, ranges from 40-85 wt.-%, preferably from 45-75 wt.-% and more preferably from 50-70 wt.-%, related to the sum of the weights of native starch, polycarboxylic polymer and non-polymeric polycarboxylic acid compound components.

In preferred embodiments of the invention, the amount of native starch ranges from 40-85 wt.-%, the amount of polycarboxylic polymer ranges from 2-45 wt.-%, and the amount of non-polymeric polycarboxylic acid compound ranges from 5-50 wt.-%, all amounts related to the sum of the weights of the three components. Also preferably, the amount of native starch in the resin ranges from 45-75 wt.-%, the amount of polycarboxylic polymer ranges from 5-30 wt.-%, and the amount of non-polymeric polycarboxylic acid compound ranges from 10-40 wt.-%, in relation to the sum of the weights of the three components. More preferably, the amount of native starch in the resin ranges from 50-70 wt.-%, the amount of polycarboxylic polymer ranges from 10-25 wt.-%, and the amount of non-polymeric polycarboxylic acid compound ranges from 15-30 wt.-%, in relation to the sum of the weights of the three components.

Through this description and in the claims, the weight percentages given of the three components native starch, polycarboxylic polymer and non-polymeric polycarboxylic acid compound, are indicated for the compounds as such, in their pure form, excluding any impurities, water or solvents which they might contain, e.g. in their commercially available forms.

In further embodiments of the invention, the non-polymeric polycarboxylic acid compound is selected from the group of citric acid, maleic acid, succinic acid and tartaric acid, their corresponding anhydrides, and the salts thereof, and mixtures thereof. Preferably, the non-polymeric polycarboxylic acid compound is selected from the group of citric acid, citrate salts (e.g. metal or ammonium citrate salts), maleic acid, maleate salts, maleic anhydride, and mixtures thereof.

The invention also concerns resins according to any of the previous embodiments, wherein the native starch has a soluble part in water at 20° C. lower than 0.15 g per 100 g of water.

Another aspect of the present invention is to provide a method for the manufacture of the inventive resin.

In yet another inventive embodiment, it is provided a formaldehyde-free aqueous binder for mineral wool comprising the curable resin of the embodiments of the invention.

The invention is also directed to the mineral wool products manufactured using the inventive resin.

The invention thus also covers a mineral wool product which comprises mineral fibers and a cured binder, wherein the cured binder is obtained by curing at >100° C. a composition comprising a resin according to any of the previous embodiments.

Very useful binders for mineral wool can be obtained from the resins of the invention, which show suitable properties for the application in the manufacture of mineral wool, particularly a reduced viscosity, as well as excellent dispersion stability. Furthermore, the resin dispersions can be conveniently diluted with large amounts of water to obtain the low solid content required for the application as a binder.

In comparison with previous resins and binders comprising dispersions of native starch and polycarboxylic polymers described in the art, the inventors surprisingly found that very useful resins and binders can be obtained by the embodiments described herein, which have reduced viscosity, without compromising the stability of the resin dispersions formed and without detrimentally affecting, and in most cases even improving, the mechanical properties of the bond obtained with the cured resins and/or binders.

Another surprising finding is that when part of the polycarboxylic polymer is replaced by non-polymeric polycarboxylic acid compound, maintaining the relative amount of native starch, the mechanical bonding strength obtained after curing the resin dispersions is not only not decreased, but it can be significantly improved.

The inventive resins and binders can also be cured at sufficient speed at the curing temperatures usually employed in industrial curing ovens for mineral wool. An additional advantage of the resins and/or binders of the invention is that they do not substantially lose mass due to thermal degradation during the curing process, what is rendered in a high efficiency of the binder. The low relative amount of polycarboxylic polymer may additionally be translated into a higher content of bio-based renewable components in the resin (e.g. when the polycarboxylic polymer is acrylic polymer obtained from crude oil and the non-polymeric polycarboxylic acid compound is citric acid or other naturally occurring compounds). Another consequence of the lower relative amount of polycarboxylic polymer, this being usually the most costly component, is that the resins of the invention can be made more economical.

The inventive binders have the additional advantage that they do not show stickiness to the different parts of the manufacturing line, before or after curing. Furthermore, the solid matter recovered as binder waste in the process-water during the manufacture of mineral wool can be recycled in its majority and added as part of new binder batches.

The inventors also found that using the resin and the binder of the invention, the bonded mineral wool product obtained after curing have also enhanced resistance to weathering influences (reduced deterioration of the mechanical properties during ageing in environmental humid conditions), if compared with previously described resin systems having similar polycarboxylic polymer relative amount. Such an improvement was not anticipated.

According to the present invention, the curable formaldehyde-free resin is in the form of a water dispersion, and comprises a water-insoluble native starch, a polycarboxylic polymer, non-polymeric polycarboxylic acid compound, and optionally additives.

In the context of the invention, formaldehyde-free is used in the sense of indicating that essentially no formaldehyde is contained in or released from the resin or the cured/uncured binders.

The inventive resin is curable, meaning that it undergoes a setting reaction (hardening reaction) when heated over 100° C. in a curing oven. Without wanting to be bounded by theory, it is believed that the resin of the invention cures by the crosslinking reaction between multiple carboxylic groups of the polycarboxylic polymer and the non-polymeric polycarboxylic acid compound, and multiple hydroxyl groups in the polysaccharide chains of the native starch. However, other curing reactions and/or setting mechanisms like chemical/physical interactions (hydrogen bonding, physical entrapment, etc.) might also play a role in the curing of the resin in the curing oven.

As a consequence of the water-insolubility of the native starch component, the curable formaldehyde-free resin and binder of the invention are in the form of an aqueous dispersion. The term "aqueous dispersion" as used herein intends to describe a system with one continuous aqueous phase and a second particulate phase dispersed in the aqueous phase. The aqueous phase comprises water and might comprise further components soluble in water, such as salts, solvents, etc. It is preferred that the aqueous dispersion comprises at least 40 wt.-% of the aqueous phase.

Through this description, the term resin refers to the aqueous mixture of components which will form a cross-linked polymeric network after curing. The resin is usually stored before it is used, although it might as well be used just after it is prepared. The term binder refers to the aqueous mixture of components which is applied to the fibers in the manufacture of mineral wool products and subsequently cured to produce the bonding of the fibers at their cross-over points. The binder is commonly prepared on-site, meaning that the binder is prepared in the mineral wool production plant, usually continuously, a few minutes (1-5 minutes) before it is applied to the fibers. In most cases, the resin will be largely diluted with fresh water or process water and mixed with additives in the mineral wool manufacturing lines in order to prepare the binder. By additives it is meant the substances which are usually needed either to assist in the manufacture of mineral wool products, or to improve the properties of the manufactured products. The resin will then be comprised as a component in the binder. In exceptional cases, where no additives are used, the resin and the binder will be the same (except for the occasional adjustment of solid content).

Water-insoluble native starch is one component of the inventive resin. Native starch is the form of starch as it occurs in the nature, e.g. in the potato, maize, wheat and cassava plants from which it is obtained. Native starch has therefore not been physically, chemically or enzymatically modified, dextrinized or pre-gelatinized. As such, native starch is a long-chain polysaccharide composed of glucose repeating units joined by glycosidic bonds. Native starch is insoluble in cold water and ethanol, and it is present in the plants in form of semi-crystalline granules. In warm water, native starch becomes swollen, the granules burst, the semi-crystalline structure is lost, and the linear amylose chains partially leach out from the structure. Thus, there exists a temperature from where the native starch can be considered "solubilized". This temperature is usually known as gelatinization temperature, and is approx. 65° C. As soon as the irreversible gelatinization process starts, it is connected with a drastic permanent increase in the viscosity of the water mixture which is maintained even if the temperature is subsequently decreased.

Two different components are found to form native starches, which are distinguished by their molecular weight and their chain structure: 1) amylose: linear polysaccharide chains with weight-average molecular weight of approx. $10^5$-$10^6$ g/mol; and 2) amylopectin: branched polysaccharide chains with weight-average molecular weight of approx. $10^6$-$10^8$ g/mol.

Depending on the source of native starch, the ratio between amylose and amylopectin can vary significantly, fact that at the end strongly affects the physical and chemical properties of native starches. It is also known to use mixtures of native starches with different amylose:amylopectin content to obtain native starches with the desired properties. The native starch of the inventive resin preferably contains a ratio in weight of amylose:amylopectin between 70:30-15:85, preferably between 65:35-20:80, and even more preferably between 40:60-25:75. This ratio can be achieved by selecting the appropriate plant source of native starch, or by mixing native starches with different amylose:amylopectin contents.

Non-limiting examples of native starches useful for the binder of the present invention are Meritena® 120, Amyzet® 150, Meritena® 400 or Amyzet® 500 from Syral, Standard Maize Starch from Roquette or C*Gel® series from Cargill.

The water insoluble native starches useful for the invention are usually available as white powders, which might contain small amounts of non-carbohydrate components. They might also contain about 10-15 wt-% humidity. In the present description, the native starch weight % values refer to the dry native starch excluding the humidity content.

Preferred particle size of the native starch is from 10-60 µm.

The temperature of gelatinization of the native starches best suited for the invention ranges from 65-85° C.

The native starch used in the resin of the invention is insoluble in water. With this it is meant that the native starch has a soluble part in water at 20° C. lower than 0.15 g per 100 g of water. The soluble part can be determined by preparing a dispersion of native starch in water at 20° C., filtering the mixture through a standard laboratory paper filter of approximately 8 µm mesh to get a clear solution, drying said clear solution at 135° C. until a dry solid residue is obtained. The soluble part is determined as the grams of solid residue in 100 g of clear solution.

The polycarboxylic polymer in preferred embodiments of the present invention comprises at least one homopolymer, at least one copolymer, or mixtures thereof. The polycarboxylic polymer is polymeric, meaning that it is formed by linking together a number of repeating monomeric units. The homopolymer and/or copolymer comprise at least two carboxylic acid groups, anhydride groups, or salts thereof, or mixtures thereof, per polymer molecule. Preferably, the polycarboxylic polymer comprises at least 10 mol-% of repeating units carrying carboxylic acid groups, anhydride groups, salts thereof, or mixtures thereof. More preferably, the polycarboxylic polymer comprises at least one polymer formed by addition polymerization of ethylene-unsaturated monomers, containing from 10 to 100 mol-% polymerized repeating units of acrylic acid, maleic acid, maleic anhydride or salts thereof, or mixtures thereof. Particularly preferred are polyacrylic acid polymers and salts thereof resulting from partial neutralization of the acrylic acid polymer.

The polycarboxylic polymers can normally be dissolved in water by mechanical means at temperatures from about 10 to 50° C. The polycarboxylic polymer has a weight average molecular weight of at least 400 g/mol, and may vary from 400 g/mol to 500,000 g/mol. More preferably, the Mw varies from 500 g/mol to 10,000 g/mol, and even more preferably from 600 g/mol to 2,000 g/mol. Non-limiting examples of polycarboxylic polymers useful for the resin in the present invention are Syntran® 8220 from Interpolymer, Craymul® 2154 from Cray Valley, or Acumer® 1000 from Dow Chemicals.

In a further embodiment of the present invention, the resin additionally comprises at least one polyol of molecular weight less than 1000 g/mol, and preferably less than 500 g/mol, such as alkane-polyol (e.g. glycerol, ethylene glycol, 1,3-propanediol, trimethylolpropane, sorbitol, erythritol, and the like) or alkanolamines (e.g. triethanolamine, trimethanolamine, tripropanolamine, and the like). The polyol acts as an agent to improve the cross-linking degree. Preferably, in this embodiment, the at least one polyol is used in a concentration of 5-45 wt.-% relative to the amount of polycarboxylic polymer.

The polyol might as well preferably comprise a mixture of alkane-polyol and alkanolamine, both with a molecular weight less than 1000 g/mol, and more preferably less than 500 g/mol. More preferably, the polyol comprises a mixture of glycerol and triethanolamine. The weight ratio of alkane-polyol to alkanolamine in the mixture of these embodiments preferably ranges from 98:2 to 10:90, more preferably from 75:25 to 25:75, and even more preferred from 65:35 to 35:65.

In preferred embodiments, a catalyst is also added to the resin in order to enhance and/or to accelerate the curing of the resin. Typical examples of useful catalysts are phosphorous-containing esterification catalysts, like alkali metal hypophosphite salts, alkali metal phosphites, alkali metal polyphosphates, and the like. A preferred catalyst is sodium hypophosphite. The concentration of the catalyst in those embodiments is preferably greater than 0.1 wt.-% and less than 2 wt.-% relative to the total solid content of the resin.

Conveniently, the polycarboxylic polymer of the invention is formed by a polycarboxylic polymer resin pre-mixture as those described in the art (e.g. in EP0583086B1). These commercially available polycarboxylic polymer resins are water solutions already comprising the preferred combination of a polycarboxylic polymer of the types disclosed above, a low molecular weight polyol (typically triethanolamine), and an esterification catalyst (e.g. sodium hypophosphite), as well as other modifiers (e.g. pH modifiers) in smaller amounts. It has to be understood that the components of the polycarboxylic polymer resin are premixed in forehand to the preparation of the resins of the invention. Non-limiting examples of polycarboxylic resin pre-mixtures useful for the present invention are Aquaset® BI700 from Dow Chemicals, Acrodur® DS3530 from BASF, or Xiran® binder 204 from Polyscope.

The resin of the invention comprises non-polymeric polycarboxylic acid compound. The term non-polymeric polycarboxylic acid compound as used herein is understood to cover the acids, any salts thereof and any precursor thereof, such as anhydrides, as well as the mixtures thereof. Different to the polycarboxylic polymer component of the resin, the non-polymeric polycarboxylic acid compounds are organic compounds formed by small molecules, with a molecular weight of <400 g/mol, and they are not polymeric, meaning that they are not formed by linking a number of repeating monomeric units together. The molecular weight of the non-polymeric polycarboxylic acid compound is indicated as free acid. By the term polycarboxylic it is meant herein that the compound carries more than one carboxylic moiety, at least two carboxylic moieties, more preferably at least three carboxylic moieties. Non-polymeric polycarboxylic acid precursors are understood here as compounds capable of forming non-polymeric polycarboxylic acid in the resin mixture, under the conditions present during the preparation or the use of the resin or the binder of the invention, either prior or during curing. These conditions include e.g. increased temperatures or pH variations. Non-limiting examples of non-polymeric polycarboxylic acid precursors are anhydrides. Unless specifically stated otherwise, through this description and in the claims, the weight percentages of non-polymeric acid salts or precursors are indicated for the corresponding acid form.

Particularly preferred non-polymeric polycarboxylic acid compound is selected from the group of citric acid, maleic acid, succinic acid and tartaric acid, their corresponding anhydrides, and salts thereof, and mixtures thereof. Preferred non-polymeric polycarboxylic acid salts are sodium salts or ammonium salts.

More preferably, the non-polymeric polycarboxylic acid compound is selected from the group of citric acid, citrate salts (e.g. metal or ammonium citrate salts), maleic acid, maleate salts, and maleic anhydride. The inventors found that citric acid is particularly advantageous, not only because of its large availability, low price and natural origin, but also because of the enhanced reactivity of the obtained resins.

The pH of the resin or the binder of the invention might be suitably adjusted with pH modifiers, including acids, such as sulfuric acid, phosphoric acid and/or hydrochloric acid, volatile bases (e.g. ammonia, amines) and non-volatile bases (e.g. NaOH). Depending on this pH value, the carboxylic groups contained in the polycarboxylic polymer and the non-polymeric polycarboxylic acid compound may be partially neutralized, forming the corresponding carboxylic salts (e.g. ammonium and sodium salts respectively for the exemplary bases above). It is preferred that the pH of the binder is acidic, preferably lower than 3, more preferably lower than 2, to obtain efficient curing.

Hydrocholoric acid aqueous solution is preferably used as pH modifier. Thus, in embodiments, the resin of the invention further comprises hydrochloric acid. The HCl can be added in gas form to the mixture, as a water solution of different concentrations, or it can be generated in-situ by reactants which generate HCl when combined (e.g. sulfuric acid combined with sodium chloride). It is preferred to add HCl as a water solution. The amount of HCl preferably ranges from 4-15 wt.-%, and more preferably from 8-12 wt.-%, in relation to the total solid content of the resin. The inventors found out that the presence of HCl further improves the mechanical bonding properties obtained with the cured inventive resin, particularly during ageing.

The method for preparing the resin of the invention in one embodiment comprises the steps of:
  a) preparing a dispersion of water-insoluble native starch in water, and
  b) contacting the dispersion obtained in step (a) with a water solution of the polycarboxylic polymer and the non-polymeric polycarboxylic acid compound, and optionally comprising further additives.

In order to avoid premature reaction and/or gelatinization of the native starch, and to produce a resin according to the invention in the form of a low viscosity dispersion, it is preferred to carry out all the steps for the preparation of the resin and the binder at a temperature below 65° C., preferably below 50° C. and most preferably in a range between 10° C. and 40° C. According to a particularly preferred method for carrying out the invention, the temperature during preparation of the resin or the binder is not raised above room temperature. In other words, it is the aim of the present invention that the water-insoluble native starch contained in the resin is applied as such (un-modified) to the mineral fibers as part of the binder dispersion composition. With this it is intended that the binder has sufficient low viscosity and flowability to be able to migrate to the cross-over points between the fibers of the mineral wool mat, before it is cured. It has to be understood that the temperature is raised above 100° C. in the curing oven, after the binder has been prepared and applied to the mineral fibers.

Preferably, the step a) is done with mechanical stirring until a homogenous dispersion is obtained.

The contacting step b) is preferably done under mechanical stirring as well. It is preferred to carry out this step b) in less than 60 minutes, and more preferably between 20 and 30 minutes.

The method for preparing the resin can be varied and is not limited to the embodiments described herein. For instance, the method may as well comprise the step of dispersing the solid native starch directly in the aqueous solution of the polycarboxylic polymer and the non-polymeric polycarboxylic acid compound, optionally also comprising further additives. In another variation of the method of the invention, the non-polymeric polycarboxylic acid compound or the optional additives might be comprised in the native starch dispersion (or in both native starch dispersion and polycarboxylic polymer solution) before the polycarboxylic polymer solution is contacted with the native starch dispersion.

The resin dispersions according to embodiments are characterized by having reduced viscosity. This reduced viscosity is very advantageous for the use in the manufacture of mineral wool, and significantly lower than the viscosity of the polycarboxylic polymer alone dissolved in water at the same concentration.

The resin dispersions additionally have very good water dilutability and good stability against sedimentation (native starch alone has poor stability in dispersion). These properties and others make the resin dispersions of the invention very useful for their application to mineral fibers by spraying in the manufacture of mineral wool.

In embodiments, the amount of polycarboxylic polymer comprised in the resin is between 2 and 45 wt.-% relative to the sum of the weights of the native starch, polycarboxylic polymer and non-polymeric polycarboxylic acid compound components.

The resins of the invention comprise at least 2 wt.-% of polycarboxylic polymer, related to the sum of the weights of the native starch, polycarboxylic polymer and non-polymeric polycarboxylic acid compound. This amount is believed to be necessary in order to obtain good mechanical bonding properties and sufficient stability of the resin dispersion. In absence of polycarboxylic polymer, or when the amount is below 2 wt.-%, the mechanical bonding strength achieved with the cured resin-based binder is significantly decreased. Additionally, dispersions prepared with a concentration of polycarboxylic polymer inferior than 2 wt.-% suffer from shorter sedimentation times.

In the other hand, the resins of the invention do not comprise more than 45 wt.-% of polycarboxylic polymer, related to the sum of the weights of the native starch, polycarboxylic polymer and non-polymeric polycarboxylic acid compound. When the amount of polycarboxylic polymer is higher than this value, the viscosity of the resin dispersion is undesirably increased.

The amounts of non-polymeric polycarboxylic acid compound and of native starch might be varied independently of each other, and independently of the amount of polycarboxylic polymer, as long as the sum of the weights of the three components native starch, polycarboxylic polymer and non-polymeric polycarboxylic acid compound adds 100 wt.-%. Thus, the amount of polycarboxylic polymer ranges from 2-45 wt.-%, preferably from 5-30 wt.-% and more preferably from 10-25 wt.-%, related to the sum of the weights of native starch, polycarboxylic polymer and non-polymeric polycarboxylic acid compound components. The amount of non-polymeric polycarboxylic acid might range from 5-50 wt.-%, preferably from 10-40 wt.-% and more preferably from 15-30 wt.-%, related to the sum of the weights of native starch, polycarboxylic polymer and non-polymeric polycarboxylic acid compound components. The amount of native starch might range from 40-85 wt.-%, preferably from 45-75 wt.-% and more preferably from 50-70 wt.-%, related to the sum of the weights of native starch, polycarboxylic polymer and non-polymeric polycarboxylic acid compound components.

Preferably, the amount of native starch ranges from 40-85 wt.-%, the amount of polycarboxylic polymer ranges from 2-45 wt.-%, and the amount of non-polymeric polycarboxylic acid compound ranges from 5-50 wt. %, in relation to the sum of the weights of three components. This means, that the sum of the three concentration wt.-% values selected from the ranges above adds 100 wt.-%. Also preferably the amount of native starch in the resin ranges from 45-75 wt.-%, the amount of polycarboxylic polymer ranges from 5-30 wt.-%, and the amount of non-polymeric polycarboxylic acid compound ranges from 10-40 wt.-%, in relation to the sum of the weights of the three components. More preferably the amount of native starch in the resin ranges from 50-70 wt.-%, the amount of polycarboxylic polymer ranges from 10-25 wt.-%, and the amount of non-polymeric polycarboxylic acid compound ranges from 15-30 wt.-%, in relation to the sum of the weights of the three components.

In the case where citric acid and/or a precursor thereof is the non-polymeric polycarboxylic acid compound, it has been found particularly advantageous when the amount of native starch ranges from 40-60 wt.-%, the amount of polycarboxylic polymer ranges from 10-30 wt.-%, and the amount of citric acid and/or a precursor thereof ranges from 10-50 wt. %, in relation to the sum of the weights of three components.

In the case where maleic anhydride is the non-polymeric polycarboxylic acid compound, it has been found particularly advantageous when the amount of native starch ranges from 60-80 wt.-%, the amount of polycarboxylic polymer ranges from 10-30 wt.-%, and the amount of maleic anhydride ranges from 10-30 wt. %, in relation to the sum of the weights of three components.

When the inventive resin is used in a binder for the manufacture of mineral wool, the binder might be prepared by adjusting the solid content with water to a preferred 4 to 20 wt.-% range. Nevertheless, the solid content of the aqueous resin dispersion of the invention is not particularly limited, and depends on the intended application.

In a preferred embodiment, in addition to the resin dispersion, other additives described in the art might be incorporated for the preparation of the inventive binder composition. Those additives are intended either to assist in the manufacture of mineral wool products, or to improve the properties of the manufactured products. Non-limiting examples of such additives are hydrophobizing agents such as silicones and fluorocarbon-polymers, de-dusting agents such as paraffin and mineral oils, adhesion promoters such as alkoxysilanes, fiber softeners, preservatives, dyes and/or corrosion inhibitors, among others. The amount of these optional additives in the inventive binder does not exceed 20 wt.-% and preferably does not exceed 10 wt.-% of the total non-aqueous content of the binder. In a suitable embodiment, the inventive binder composition might also comprise at least one filler or resin extender such as urea, sugars, molasses, lignosulfonates or tannins. Resin extenders are compounds added to resin compositions to "extend" the resin, thereby reducing the resin usage and reducing the total resin cost, and which, up to a certain concentration, do not deteriorate unacceptably the final resin properties. The amount of optional filler and/or resin extender in the inventive binder does not exceed 30 wt.-% and preferably does not exceed 20 wt.-% of the total non-aqueous content of the binder. The time from the moment the binder additives are contacted with the resin until the binder is applied to the mineral fibers usually ranges from 1 to 5 minutes. It is also possible, according to an embodiment, that these additives, provided they do not compromise the stability, might as well be incorporated already in the resin dispersion, before the binder is prepared. It is also preferred that the total amount of optional additives plus filler or resin extender in the inventive binder is no more than 30 wt.-% of the total non-aqueous content of the binder, and even more preferably no more than 20 wt.-%.

As mentioned above, it is an aim of the present invention that the water-insoluble native starch is not modified before the binder is applied to the mineral fibers. This means that the native starch is not hydrolyzed, gelatinized or dextrinized at least until the binder has been applied onto the mineral fibers.

In embodiments, the binder of the invention might be then applied by spraying to the individual mineral fibers after fiberization, while the fibers still retain some residual heat. The impregnated fibers are then collected on a foraminous conveyor in a forming chamber, where a primary un-cured mat is formed. A significant part of the water comprised in the binder is evaporated at this stage. Due to the specific composition of the resins of the invention, the viscosity of the inventive resin and binder is particularly low. This allows first that the binder can more homogenously be distributed on the fibers, and second, that it can more efficiently flow to the intersections of the fibers in the mat before it is cured. This produces mineral wool products with better properties.

The binder is preferably applied in an amount to produce a solid binder content in the final product after drying and curing between 3-12 wt.-%, relative to the weight of the mineral wool product. This amount of cured binder is measured as LOI (loss on ignition) according to ISO 29771: 2008.

After the fibers have been impregnated and the primary mat is formed, the inventive binder is cured at temperatures above 100° C., preferably at a temperature between 140-180° C. The curing time preferably ranges from 3-5 min. The cured mineral wool mat is afterwards trimmed and shaped into its final dimensions, optionally rolled up, and packaged. Additional facing layers like paper, aluminum, glass veil or mixtures thereof might also be applied to the mineral wool depending on its intended application.

When the inventive binders are employed in the manufacture of mineral wool products, it has been observed that they can advantageously be cured faster and at reduced temperatures in comparison to other binders based on carbohydrates different than native starch, and that their mass loss by thermal degradation during curing is also lower, actually negligible, while maintaining a whitish-tan color.

Even more importantly, the mineral wool products bonded with the binders of the invention show similar or even improved mechanical properties than those bonded with native starch binder systems having similar relative amounts of polycarboxylic polymer. The inventive resins allow limiting the relative amount of polycarboxylic polymer below 45 wt.-% in relation to the sum of the weights of the three components native starch, polycarboxylic polymer and non-polymeric polycarboxylic acid compound, while simultaneously improving or at least maintaining the mechanical performance of the bonding obtained by the cured binder.

In embodiments of the invention, the curable resin in the form of an aqueous dispersion consists of a) water-insoluble native starch, b) a polycarboxylic polymer, and c) non-polymeric polycarboxylic acid compound, wherein the amount of polycarboxylic polymer (b) comprised in the resin is between 2 and 45 wt.-% relative to the sum of the weights of the components a), b) and c) as described above, without any additional component.

The mechanical bonding properties achieved with the cured resin are determined by measuring the maximal load of stress-strain curves measured from glass bead samples bonded with the cured resins. In this method, 100 g of glass beads with an average diameter of 200-300 micrometers from the supplier "Abrasivos y Maquinaria S.A." are thoroughly mixed with 20 g of resin dispersion having 25 wt.-% solid content. Afterwards, the mixture is poured into stainless steel molds to produce specimens with the dimensions 81 mm×22 mm×7 mm. The specimens in the molds are dried and cured at 200° C. for 25 minutes in a ventilated oven. The stress-strain curves are obtained by subjecting the specimens to stretching with a tensiometer at a constant pulling rate of 5 mm/min while registering the pulling force applied to the specimen.

The viscosity of the resin dispersions of the embodiments of the invention is measured at 20° C. using a Brookfield viscosimeter, spindle 1, 100 rpm. The viscosity as referred to in the present description is based on a resin concentration having a solid content of 45 wt.-% in water.

The invention therefore also relates to an improved mineral wool product which comprises mineral fibers and a cured binder according to the different inventive embodiments described. The mineral wool thus, in embodiments of the invention, comprises mineral fibers and a cured binder, the cured binder obtained by curing at >100° C. a composition comprising any of the previous resin embodiments, in particular a composition comprising a) water-insoluble native starch, b) polycarboxylic polymer, and c) non-polymeric polycarboxylic acid compound, as well as other optional components and additives as described above, and wherein the amount of polycarboxylic polymer (b) comprised in the resin is between 2 and 45 wt.-% relative to the sum of the weights of the components a), b) and c). More preferably, the amount of native starch in the composition ranges from 40-85 wt.-%, the amount of polycarboxylic polymer ranges from 2-45 wt.-%, and the amount of non-polymeric polycarboxylic acid compound ranges from 5-50 wt.-%, all amounts related to the sum of the weights of the components a), b) and c).

The inventive mineral wool products can be used for instance in the thermal and acoustic insulation of buildings, transportations or appliances, or for fire protection, as well as for other non-insulation applications.

EXAMPLES

Different inventive and comparative examples of resins are described in this section and contained in Tables 1 and 2. These examples are included to help to describe the invention, but they are not intended to be limiting.

In Table 1 and 2, the amounts of native starch, polycarboxylic polymer and non-polymeric polycarboxylic acid compound are given as wt.-% in relation to the sum of the weights of the resin components. The maximum load values (mechanical bonding strength) and the viscosity of the dispersions are measured according to the methods described above. The loss on ignition (LOD, a measure of the resin content, in the prepared specimens, is in the range 4-5 wt.-%.

The raw materials used in the examples are:
Native starch: Maritena 120 supplied by Syral
Polycarboxylic polymer: Polyacrylic acid resin pre-mixture Aquaset BI700 supplied by Dow Chemicals containing triethanolamine and sodium hypophosphite catalyst.
Non-polymeric polycarboxylic acid compound: Succinic acid Biosuccinium® supplied by Helm Iberica; citric acid, maleic anhydride and tartaric acid supplied by Sigma Aldrich.

The amounts of each component and the amount of water will depend on the total amount of resin to be prepared and on the concentration of the selected raw materials. Nevertheless, these amounts can be easily calculated by the skilled in the art from the percentages in Tables 1 and 2 to obtain resin dispersions with 45 wt.-% final solid content.

The resins are prepared at room temperature following this general procedure:
1) One container equipped with a mechanical stirrer is charged with the calculated amounts of water and monomeric polycarboxylic acid (citric acid, succinic acid, tartaric acid or maleic acid), and the mixture is stirred vigorously for 10 minutes until a homogeneous and transparent solution is obtained.
2) The calculated amount of acrylic resin Aquaset BI 700 is added to the solution prepared in step 1), maintaining the stirring for 15 minutes more in order to assure homogeneous mixture.
3) Then, the corresponding quantity of native starch is slowly added to the solution resulting from step 2). After all the native starch has been added, the stirring is kept for another 20 minutes in order to assure good dispersion.

The resins obtained by this process are in form of milky, low viscosity water dispersions.

Examples 1-10

Examples 2-10 are embodiments of the inventive resins, whereas example 1 is a non-inventive comparative example. They all have in common, that the amount of native starch is 50 wt.-% relative to the sum of the weights of the resin components.

FIG. 1 depicts a graphical comparison of the viscosity, measured according to the method described above, of the examples 1-10. It can be appreciated the significant reduction of viscosity in the inventive resins when compared to example 1.

Figure 2:
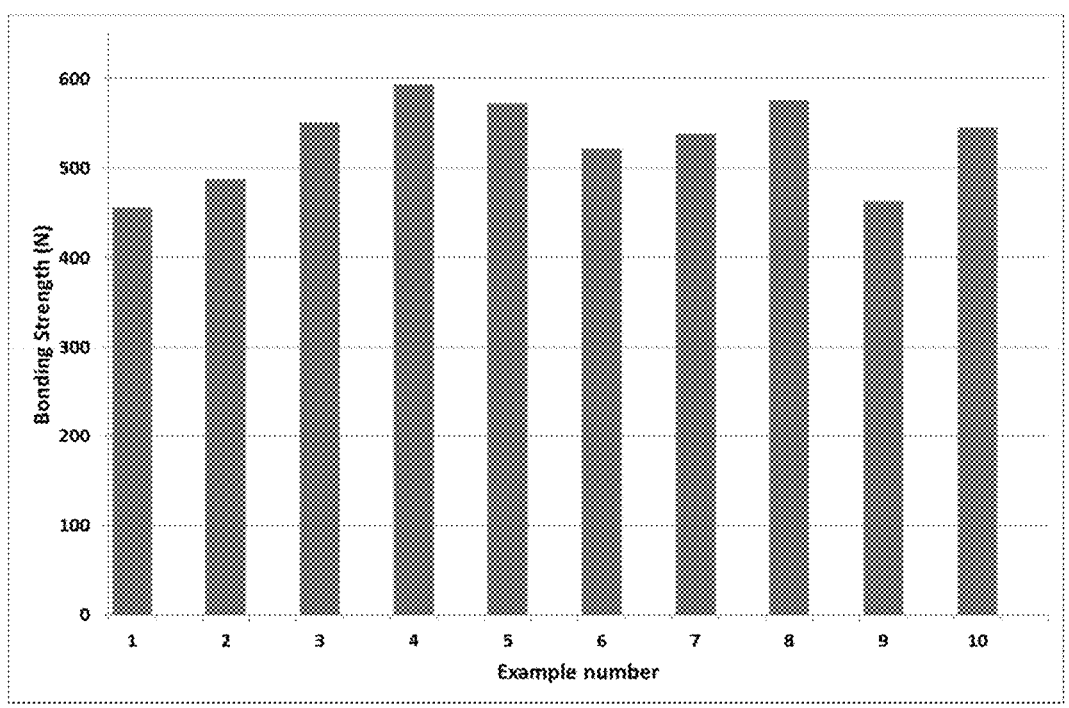
FIG. 2 is a graphical representation of the values of bonding strength (maximal load) obtained with resins of examples 1-10. Examples 2-10 are inventive examples, while example 1 is a non-inventive comparative example.

FIG. 2 depicts a graphical comparison of the bonding strength (maximum load) obtained as described above from resins of examples 1-10. There, it can be seen that the bonding strength of the inventive resins (examples 2-10) is not only maintained, but in most cases improved, when compared with the non-inventive example 1, and this despite the inventive resins having reduced viscosity and reduced relative amount of polycarboxylic polymer.

Examples 11-15

Examples 12-15 are embodiments of the inventive resins, whereas example 11 is a non-inventive comparative example. They all have in common, that the amount of native starch is 70 wt.-% relative to the sum of the weights of the resin components.

Figure 3:
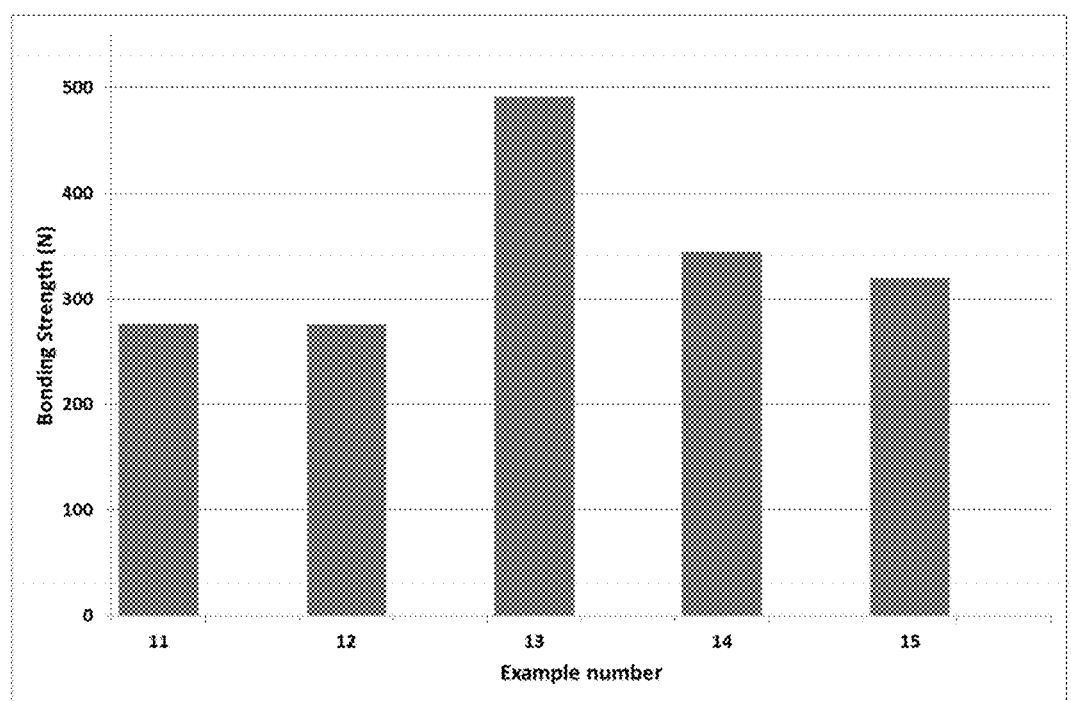
FIG. 3 is a graphical representation of the values of bonding strength (maximal load) obtained with resins of examples 11-15. Examples 12-15 are inventive examples, while example 11 is a non-inventive comparative example.

FIG. 3 depicts a graphical comparison of the bonding strength (maximum load) obtained as described above from resins of examples 11-15. There, it can be seen that the bonding strength of the inventive binders is not only not decreased, but in some cases significantly improved, when compared with example 11. These results confirm the unanticipated finding that the polycarboxylic polymer can be replaced by non-polymeric polycarboxylic acid compound, while maintaining the relative amount of native starch, without detrimentally affecting the mechanical bonding properties obtained by the cured resin, and even significantly improving them.

Examples 4, 9 and 11

As mentioned above, examples 4 and 9 are embodiments of the inventive resins, whereas example 11 is a non-inventive comparative example. The three examples have in common, that the relative amount of polycarboxylic polymer is around 30 wt.-% relative to the sum of the weights of the resin components.

Figure 4:
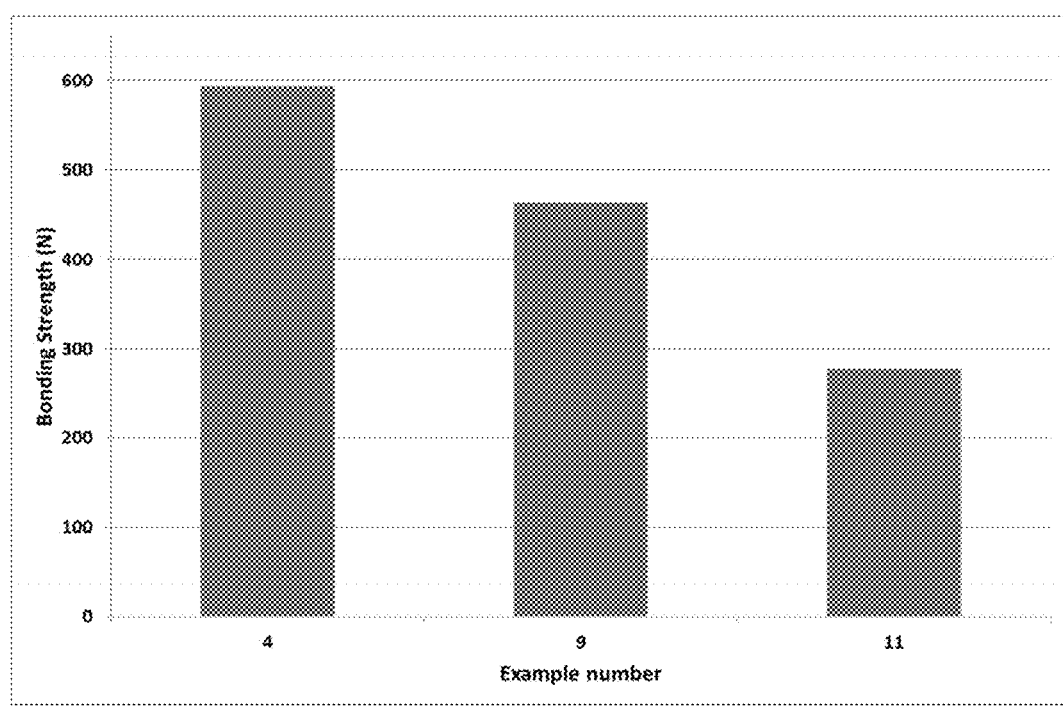
FIG. 4 is a graphical comparison of the values of bonding strength (maximal load) obtained with resins of examples 4, 9 and 11. Examples 4 and 9 are inventive examples, while example 11 is a non-inventive comparative example.

FIG. 4 depicts a graphical comparison of the bonding strength (maximum load) obtained as described above from resins of these examples. There, it can be seen that although the amount of polycarboxylic polymer is similar, the bonding strength of the resins of examples 4 and 9 is much higher than the one obtained with the resin of example 11. These results confirm the surprising finding that in the resins of the invention, the relative amount of polycarboxylic polymer can be selected to be relatively low, without detrimentally affecting, but even improving, the mechanical bonding strength obtained with the resin after curing.

TABLE 1

| Example | Native starch (wt.-%) | Polycarboxylic polymer (wt.-%) | Non-polymeric polycarboxylic acid compound (wt.-%) | Bonding strength (N) | Viscosity (mPa · s) |
|---|---|---|---|---|---|
| 1* | 50.0 | 50.0 | — | 456 | 25 |
| 2 | 50.0 | 39.5 | 10.5 Citric acid | 488 | 17 |
| 3 | 50.0 | 35.0 | 15.0 Citric acid | 551 | 16 |
| 4 | 50.0 | 29.0 | 21.0 Citric acid | 594 | 14 |
| 5 | 50.0 | 20.0 | 30.0 Citric acid | 572 | 8 |
| 6 | 50.0 | 10.0 | 40.0 Citric acid | 522 | 12 |
| 7 | 50.0 | 39.5 | 10.5 Maleic anhydride | 538 | 16 |
| 8 | 50.0 | 35.0 | 15.0 Maleic anhydride | 576 | 16 |
| 9 | 50.0 | 29.0 | 21.0 Maleic anhydride | 463 | 14 |
| 10 | 50.0 | 2.0 | 48.0 Maleic anhydride | 546 | 15 |

*Comparative example

TABLE 2

| Example | Native starch (wt.-%) | Polycarboxylic polymer (wt.-%) | Non-polymeric polycarboxylic acid compound (wt.-%) | Bonding strength (N) | Viscosity (mPa · s) |
|---|---|---|---|---|---|
| 11* | 70.0 | 30.0 | — | 277 | — |
| 12 | 70.0 | 9.0 | 21.0 Citric acid | 276 | 17 |
| 13 | 70.0 | 9.0 | 21.0 Maleic anhydride | 491 | 14 |
| 14 | 70.0 | 9.0 | 21.0 Succinic acid | 345 | 23 |
| 15 | 70.0 | 9.0 | 21.0 Tartaric acid | 320 | 18 |

*Comparative example

What is claimed is:
1. A curable formaldehyde-free resin in the form of an aqueous dispersion, comprising components a), b) and c), wherein:
  a) is water-insoluble native starch,
  b) is a polycarboxylic polymer, and
  c) is non-polymeric polycarboxylic acid compound, and wherein the amount of polycarboxylic polymer (b) comprised in the resin is between 2 and 45 wt.-% relative to the sum of the weights of the components a), b) and c), and wherein the viscosity of the resin dispersion is less than 20 mPa·s determined at 20° C. at a solid content of 45 wt.-%.

2. The resin of claim 1, wherein the amount of polycarboxylic polymer (b) ranges from 5-30 wt.-%, related to the sum of the weights of the components a), b) and c).

3. The resin of claim 1, wherein the amount of non-polymeric polycarboxylic acid compound (c) ranges from 5-50 wt.-%, related to sum of the weights of the components a), b) and c).

4. The resin of claim 1, wherein the amount of native starch (a) ranges from 40-85 wt.-%, related to the sum of the weights of the components a), b) and c).

5. The resin of claim 1, wherein the amount of native starch ranges (a) from 40-85 wt.-%, the amount of polycarboxylic polymer (b) ranges from 2-45 wt.-%, and the amount of non-polymeric polycarboxylic acid compound (c) ranges from 5-50 wt.-%, all amounts related to the sum of the weights of the components a), b) and c).

6. The resin of claim 1, wherein the non-polymeric polycarboxylic acid compound (c) is selected from the group of citric acid, maleic acid, succinic acid and tartaric acid, their corresponding anhydrides, and the salts thereof, and mixtures thereof.

7. The resin of claim 1, wherein the polycarboxylic polymer (b) comprises a homopolymer, a copolymer, or mixtures thereof, wherein the homopolymer and/or copolymer comprise at least two carboxylic acid groups, anhydride groups, or salts thereof, or mixtures thereof, per polymer molecule.

8. The resin of claim 1, wherein the polycarboxylic polymer (b) comprises a polymer formed by addition polymerization of ethylene-unsaturated monomers, containing from 10 to 100 mol-% polymerized repeating units of acrylic acid, maleic acid, maleic anhydride or salts thereof, or mixtures thereof.

9. The resin of claim 1, additionally comprising a polyol of molecular weight less than 1000 g/mol, more preferably less than 500 g/mol.

10. The resin of claim 1, additionally comprising a mixture of an alkane-polyol and an alkanolamine, each having a molecular weight less than 1000 g/mol.

11. The resin of claim 10, where the mixture of an alkane-polyol and an alkanolamine includes glycerol and triethanolamine.

12. The resin of claim 1, additionally comprising an esterification catalyst.

13. The resin of claim 1, wherein the polycarboxylic polymer (b) is formed by a polycarboxylic polymer resin pre-mixture comprising polycarboxylic polymer, polyol of molecular weight less than 1000 g/mol, and esterification catalyst.

14. The resin of claim 1, wherein the resin further comprises hydrochloric acid.

15. A method for the manufacture of the resin of claim 1, comprising preparing an aqueous dispersion of water-insoluble native starch and contacting the water-insoluble native starch with a polycarboxylic polymer and with non-polymeric polycarboxylic acid compound.

16. A formaldehyde-free aqueous binder for mineral wool comprising the curable resin of claim 1, optionally comprising additives, fillers and/or resin extenders, and with a solid content of 4 to 20 wt.-%.

17. A mineral wool product comprising mineral fibers and cured binder, wherein the cured binder is obtained by curing at >100° C. a binder according to claim 16.

18. The resin of claim 1, wherein the amount of non-polymeric polycarboxylic acid compound (c) ranges from 15-30 wt.-%, related to sum of the weights of the components a), b) and c).

19. The resin of claim 1, wherein the amount of native starch (a) ranges from 50-70 wt.-%, related to the sum of the weights of the components a), b) and c).

20. The resin of claim 1, wherein the amount of polycarboxylic polymer (b) ranges from 10-25 wt.-% related to the sum of the weights of the components a), b) and c).

* * * * *